United States Patent

Galiyano et al.

[11] Patent Number: 5,224,357
[45] Date of Patent: Jul. 6, 1993

[54] MODULAR TUBE BUNDLE HEAT EXCHANGER AND GEOTHERMAL HEAT PUMP SYSTEM

[75] Inventors: Mike P. Galiyano, Wyomissing Hills; Mark J. Galiyano, Sinking Spring; B. Ryland Wiggs; Jeffery T. Aspacher, both of Bethlehem, all of Pa.

[73] Assignee: United States Power Corporation, Allentown, Pa.

[21] Appl. No.: 725,962

[22] Filed: Jul. 5, 1991

[51] Int. Cl.$^5$ .............................. F28D 21/00
[52] U.S. Cl. ....................... 62/260; 165/45
[58] Field of Search ............ 62/260; 165/45, 45 H; 418/55.6

[56] References Cited

U.S. PATENT DOCUMENTS

| | | | |
|---|---|---|---|
| 654,264 | 7/1900 | Lueder et al. | 62/260 |
| 2,554,661 | 5/1951 | Clancy | 62/260 |
| 3,601,186 | 8/1971 | Smith et al. | 165/45 |
| 4,058,982 | 11/1977 | Wright | 62/260 X |
| 4,277,946 | 7/1981 | Bottum | 62/235.1 |
| 4,332,535 | 6/1982 | Terauchi et al. | 418/55.6 |
| 4,382,370 | 5/1983 | Suefuji et al. | 62/324.1 |
| 4,383,419 | 5/1983 | Bottum | 62/238.6 |
| 4,648,814 | 3/1987 | Shiibayashi | 418/55.6 |
| 4,688,717 | 8/1987 | Jungwirth | 237/2 B |
| 4,741,388 | 5/1988 | Kuroiwa | 165/45 |
| 4,753,285 | 6/1988 | Rawlings | 165/45 |
| 4,796,676 | 1/1989 | Hendershot et al. | 141/83 |
| 4,860,544 | 8/1989 | Krieg et al. | 62/260 |
| 4,995,502 | 2/1991 | Geppelt et al. | 165/45 |
| 5,025,634 | 6/1991 | Dressler | 62/74 |
| 5,054,541 | 10/1991 | Tripp | 165/45 |

Primary Examiner—Henry A. Bennet
Assistant Examiner—William C. Doerrler
Attorney, Agent, or Firm—Eckert, Seamans, Cherin & Mellott

[57] ABSTRACT

A geothermal heat exchanger having modular tube bundles is provided in a novel heat pump system. The modular tube bundles are particularly adapted to be placed within a narrow excavation in the ground, such as a trench excavated using a backhoe bucket, which trench can be V-shaped. A heat resistant soaker hose is disposed above or about the rectangular tube bundles. The soaker hose is coupled to a water source and has a number of apertures for leaching water to the soil surrounding the tube bundles for dampening the soil around the tubes and providing better thermal heat transfer and compaction. Individual tubes of the tube bundles can be made rifled or finned for better heat transfer. A scroll compressor with relatively orbiting spiral scroll fins is provided rather than a reciprocating piston compressor. The scroll compressor, unlike a reciprocating compressor, can efficiently pump fluid in a liquid state, will start against a high differential pressure, and provides more suction for oil return from the ground coils to the compressor. Corrosion of the in-ground preferably copper heat exchanger tubes is prevented by a sacrificial anode cathodic protection system. A microprocessor coupled to a variable speed compressor controls the system and the rate of refrigerant flow. An oil separator at the outlet of the compressor discharges in a closed loop at the inlet of the compressor and eliminates oil from the heat exchanger section of the refrigerant flow path.

26 Claims, 5 Drawing Sheets

MODULAR TUBE BUNDLE HEAT EXCHANGER AND GEOTHERMAL HEAT PUMP SYSTEM

BACKGROUND OF THE INVENTION

1. Field of the Invention

This invention relates to the field of heat pump systems and in particular to ground source heat pump systems. The invention provides a system having modular in-ground heat exchangers suitable for simple installation in a trench, and particular compressor and circulation features facilitating installation and operation of a heat pump system for heat transfer to and from the earth.

2. Prior Art.

Heat pump systems are increasingly popular for efficient heating and cooling of loads, for example as part of a heating-ventilation-air conditioning (HVAC) system for buildings. Heat pump systems generally include heat exchangers thermally coupled to the load and to a heat source or heat sink, the heat exchangers being connected in a refrigerant or coolant loop which includes a compressor and an expander. The compressor raises the pressure (and therefore the temperature) of the refrigerant and the expander lowers the pressure, producing a lower temperature in the refrigerant gas.

In heating a load, a "ground source" heat pump, which has the source/sink heat exchanger thermally conductively coupled to the ground, can extract a virtually limitless supply of thermal energy from the earth and transfer the energy, at higher temperature, to the load. A heat pump cools a load by extracting thermal energy from the load and transferring it, at higher temperature, to the earth for dissipation therein. In this manner the ground functions as either a heat sink or heat source. Modern day heat pumps for HVAC systems are equipped with reversing features such as valves to arrange the flow of refrigerant so that they may both heat and cool the load, as needed.

A ground source heat pump requires a subterranean heat exchanger. While it is possible to use intermediate heat exchangers for transferring heat through thermally coupled fluid flow paths or the like, preferably the refrigerant or coolant is pumped through the pipes by the compressor and serves directly as the carrier for conveying the thermal energy to or from the ground. Thus, extra heat transfer losses, such as those inherent in ground water source systems, are avoided. The coolant is relatively heated by compression and cooled by expansion, leading to the respective heat exchangers, thereby raising the temperature of the hot side heat exchanger above the temperature of the load and lowering the temperature of the cool side heat exchanger below the temperature of the source, whereupon heat transfer occurs. Compression and expansion normally include a change of state of the coolant between liquid and gaseous states.

The load heat exchanger is typically above ground and the ground heat exchanger is preferably well below the surface of the ground. Connecting pipes for the ground heat exchanger, and the pipes defined by the heat exchanger itself, can be horizontal, vertical or slanted. A typical installation may include combinations of these orientations, depending upon particular design criteria. A number of potential problems, however, are encountered with each possible orientation of the connecting pipes as well as pipes included in the heat exchanger itself. For example, vertically oriented pipe arrangements, which might define a buried U-bend, are expensive and difficult to install, in part due to the necessity of forming deep vertical holes in the ground. Equipment to accomplish such boring is typically complex and expensive. Such holes have a tendency to cave-in during or after the excavation process. Additionally, accomplishing oil return to the compressor is difficult, especially when the system is designed to operate in both the heating and cooling mode. On the other hand, vertically elongated arrangements define less of an obstruction to earth which is replaced after installation, which (at least at the heat exchanger) must be placed in intimate contact with the refrigerant carrying means in order to achieve good thermal coupling with the earth.

A problem with vertical extensions is the tendency for gas to rise upward through liquid. For example, if a segment of gas were disposed at the buried U-bend of a vertically oriented pipe, it would tend to bubble up through the liquid without pushing the liquid on through the system. The gas would pass through the liquid unable to push the liquid through the coils. The liquid, as well as intermixed refrigerant and oil/lubricant, would thus settle at the bottom of the coils, reducing efficiency and/or resulting in compressor failure.

Arrangements which encompass a substantial horizontal area, for example including horizontal or slanted in-ground pipes, require a large land area for installation. Whereas the array of pipes defining a heat exchanger must be buried deeply, the installer may have to remove a huge quantity of earth to place the pipes, and then must replace the earth over the pipes. The problem can be daunting when using multiple loops in a horizontally oriented pattern. Further, the use of horizontal pipes typically result in refrigerant pipe crossovers, which may reduce efficiency. Existing gas and water lines further complicate the installation.

The choice of horizontal, vertical and slanted pipe runs is constrained in known ground source systems by operational complications in addition to installation problems, especially in conjunction with the reciprocating piston type compressor which conventionally drives the refrigerant flow in known heat pump systems. Inasmuch as the ground heat exchanger must be buried, at least some vertically oriented pipe runs are almost always needed. A notable problem is encountered in that when an energy demand cycle is completed, the compressor which drives the flow of refrigerant shuts down pending a subsequent demand for energy transfer. As a result, a certain amount of refrigerant then passing through the subterranean pipes looses its momentum and remains at low points in the pipes where it cools and may condense. The compressor is generally designed for efficient pumping of refrigerant in the gaseous state as opposed to liquid. When the compressor come on after an off cycle it may quickly deplete the gaseous refrigerant upstream of the compressor along the flow path, such that a low pressure condition is created at the input of the compressor. Gaseous refrigerant in the circuit may also be trapped between quantities of liquid refrigerant even in a horizontal arrangement. Moreover, the refrigerant has a certain inertia, particularly in the liquid phase. For these reasons, the compressor may encounter substantial loading problems when starting up after an off cycle.

Heat pump systems typically include control features designed to prevent compressor damage due to overloading. Most systems are designed to interpret a low pressure condition at the compressor input as an indication that insufficient refrigerant exists in the system to function properly. As a result, the compressor is automatically shut down when a low pressure condition is sensed in order to protect against failure of the compressor due to absence of sufficient refrigerant.

A pressure problem is typically encountered with a reciprocating compressor during regular on/off operational cycles. To allow pressures to equalize during such periods, the prior art, such as U.S. Pat. No. 5,025,634 - Dressler, resorts to the use of a bleeder hole in a pressure valve or wall. This may result in a slight system efficiency loss under certain operating conditions.

A similar but more pronounced low pressure problem is encountered when a reversible system changes from a heating mode to a cooling mode. Such a change inherently causes an imbalance in refrigerant capacity after reversing. This imbalance results from the much larger volume capacity of the subterranean heat exchanger as compared to the volume capacity of the load heat exchanger.

When the operating cycle is reversed, additional time must be allowed to manipulate the excess refrigerant whereby the refrigerant can assume its appropriate redistribution throughout the system in order to properly function in the reverse mode. During this redistribution period, a low pressure condition is created at the input of the compressor. The relatively short time interval allowed for the low pressure condition at the compressor input, before shutdown to protect the compressor, can be insufficient for a typical reciprocating piston type compressor to overcome the inertial resistance of stagnant refrigerant in the subterranean pipes and to redistribute the refrigerant for operation in the reverse mode. As previously described, a continued low pressure condition at the compressor input causes the compressor to automatically prematurely shut down.

A further problem with reciprocating piston compressors in ground source heat pump systems results from the typical fact that the compressor lubricant mixes and flows with the refrigerant. The compressor lubricant can, consequently, in the ground coils, ultimately accumulate resulting in compressor lubricant loss and failure.

Prior art attempts to circumvent the aforesaid problems, including problems related to pressure, include utilizing a bleeder hole in a valve/wall, and/or altering the heat pump design to orient the flow paths such that low pressure conditions and obstructions are less likely to occur, or cause fewer problems when they do occur. An example is to use a plurality of thermally coupled closed loop fluid circuits working in combination. A horizontally oriented refrigerant loop (i.e., with the compressor and expander), for example, can be thermally coupled to a vertically disposed subterranean loop which simply circulates a heat exchange fluid through the heat exchanger. These solutions, besides being complex and inefficient with respect to heat transfer performance as well as installation as discussed above, tend to create new problems at least as serious as those remedied.

An example of a reversing cycle heating system for a building comprising a heat pump and heat exchanging tubes is disclosed by U.S. Pat. No. 4,688,717 - Jungwirth. In Jungwirth, a central distributor communicates with a plurality of downwardly inclined heat exchanging tubes. Jungwirth emphasizes a multitude of buried refrigeration loops for optimum heat exchange with the earth. The plurality of buried refrigeration loops in Jungwirth necessarily complicates the excavating process. It is necessary to bore a plurality of holes radially outward from a central excavation site or to excavate and later refill a substantial volume of earth. Further, this design solely operates in a heating mode.

German Offenlegungsschrift 35 14 191 - Waterkotte (Oct. 23, 1986) discloses a series of looped lines extending to and from a central manifold, specifically placed to facilitate oil return to the compressor.

U.S. Pat. No. 4,383,419 Bottum shows a heat pump heating system having a series of slightly slanted tubes buried horizontally underground or located horizontally under water. The refrigerant is used as the heat transfer fluid, with one manifold being disposed slightly below the other.

U.S. Pat. No. 4,741,388 - Kuroiwa and U.S. Pat. No. 4,277,946—Bottum depict vertically oriented heat exchangers requiring deep, vertical earth boring. Other designs known in the art such as Dressler include systems with oversized accumulators so as to avoid slugging the compressor with liquid refrigerant, pressure equalization bleeder valves, storage and recycling devices, self-adjusting refrigerant flow cooling valves and flow reversing valves. These special provisions are intended to remedy the above-mentioned coolant imbalance and pressure problems as well as the problem of lubricant accumulation within the heat exchange tubes or connecting conduits.

It would be advantageous to resolve the foregoing problems without resort to various complications that each involve additional cost, installation steps, maintenance and operational limitations. A heat pump based heating/cooling system is therefore needed which is devoid of the inherent limitations and complications associated with present day systems of this nature, but is at the same time robust and efficient. In particular, a system not subject to pressure imbalances or deficiencies, and which is insensitive to accumulation of lubricating oil is needed. Preferably the system should have straightforward refrigerant and thermal flow paths involving a minimum of elements. It is further desirable to provide such a ground source heat pump heating/cooling system wherein the ground source heat exchanger or heat exchange tubing does not require disruption of a large area of land or the forming and back filling of complex holes.

SUMMARY OF THE INVENTION

It is an object of this invention to provide a ground source heat exchanger which reduces the drilling and backfilling costs and problems associated with vertically oriented and slanted exchangers.

It is also an object of the invention to provide an in-ground heat exchanger for use with a heat pump based heating/cooling system which eliminates large land area requirements and excavation/backfill steps associated with horizontally arrayed, or substantially horizontal heat exchangers.

It is a further object of this invention to provide a compressor mechanism for a ground source heat pump system which eliminates refrigerant phase and compressor oil problems, and substantially eliminates the need for a refrigerant accumulator and/or an oversized refrigerant accumulator.

Another object of the invention is to provide a compressor and in-ground heat exchanger arrangement which is insensitive to equalization problems encountered with prior art reciprocating piston compressors.

A further object of the invention is to provide oversized air handler coils for more efficient thermal transfer of the extra heat generated via the subject in-ground heat exchange coil design.

Another object of the invention is to provide cathodic protection to these unique in-ground metal ground source exchange coils so as to prevent metal decay and so as to extend system life.

In the accomplishment of these objects, arrays of modular, in-ground, heat exchangers are provided, each comprising tubes which are readily placed in trenches formed simply using a backhoe or the like. Trenches formed could be U-shaped or, to avoid danger of trench collapse when installing coils, V-shaped. A reciprocating, or preferably a scroll type compressor drives flow of refrigerant through the heat pump circuit. A scroll compressor is relatively insensitive to variations in the phase and content of the material pumped whether liquid or gas. Consequently, large or oversized accumulators, as provided by U.S. Pat. No. 5,025,634 - Dressler, are unnecessary. The heat exchanger arrays include grouped, connected tubes which are vertically placed in trench excavations along the sides of the trenches. The coils have relatively small inner and outer diameters whereby they may be rolled-up prior to installation. The tubes are rolled up prior to shipping and unrolled at the time of installation and placed along the trench walls. Stakes having preformed coil attachment parts are evenly disposed intermittently along the trench wall and hold the coils against the trench walls. The individual coils are held the requisite distance apart by the attachment parts of the stakes. Connections between particular tubes are provided generally made at each tube end, for example using a header structure that defines successive paths of the refrigerant in alternating directions through the tubes in the array, the fluid traversing each tube in the array. This provides substantial fluid-tube and tube-ground surface contact for maximum thermal interaction between the refrigerant within the tube and the ground. The tubes are generally aligned in a vertical plane relative to each other, with one set of tubes on each respective side of its' subject trench. The tubes are held on the sides of the trench via their affixation to stakes, which also serve to keep the tubes spaced equidistant from one another so as to avoid tube-to-tube contact, crossovers, and resulting inefficiencies.

The modular bundle of tubes is particularly adapted to be placed in a simple earth excavation such as the trough formed by a backhoe. For this reason, the tube bundles are preferably placed along each side of a 2 foot wide trench, corresponding to a standard width of a backhoe bucket. The relatively short length and width of the trenches for the subject copper coils allows this design's installation in small land areas and without major disruption to alternate land usage.

Alternately, the tube configuration can be installed in a V-shaped trench formed in the earth by appropriate machinery, such as a backhoe digging a wider width at the top and a narrower width at the bottom. A V-shaped is advantageous as less prone to collapse than a U-shaped trench. It is appropriate to provide standard length trenches e.g. 10 to 50 feet, etc.

The subject tube bundles are preferably placed in the earth to dispose the top layer of tubes below the frost line. This provides for efficient interaction between refrigerant in the tubes and the relatively constant temperature existing below ground, and prevents damage to the tubes and connections due to frost heaving, i.e., periodic ground contraction and expansion as the ground alternately freezes and thaws. In warmer climates wherein the heat pump is primarily used to cool the load, the bundle can be placed closer to the surface. Typically, the coils are placed so that the top layer of tubes is about four feet beneath the ground surface where the ground remains relatively cool and freezing rarely or never occurs. However, in extremely hot, desert areas, the coils need to be buried deeper, so as to avoid the extreme usual ground surface heat. When installing in locations having a rock substrate, the coils can be longer and buried shallower.

A plurality of individual tubes of each of one or more heat exchanger units are coupled to a distributer for interfacing the tubes to the system conduits and compressor. The distributer has a number of plates and fittings adapted for interfacing to a plurality of tube ends whereby the refrigerant in the system is evenly distributed into the interfaced tubes and substantially equal quantities of refrigerant are passed through each tube of the bundle during system operation. If a large capacity is required, a plurality of interconnected, physically separate bundles are linked serially or in parallel. In a parallel arrangement, a secondary distributor having plates and apertures can be used to distribute equal flows of refrigerant to each of the plurality of individual bundles in the same manner that the distributor for a given bundle distributes flow to the individual tubes.

A heat exchanging cartridge preferably comprises a plurality of substantially parallel spaced tube members for carrying refrigerant, defining a cartridge unit. The cartridge is placed in the trench whereby the tubes are disposed adjacent to the trench walls. It is advantageous for improved heat transfer to provide the tubes with either or both of rifled inner surfaces and finned outer surfaces to increase the surface area of refrigerant to ground interaction.

In order to address operating problems of reciprocating piston compressors of known heat pump systems, a scroll type compressor is preferably employed. Reciprocating type compressors, as noted above, are generally designed to pump gas as opposed to liquid, and can be overloaded or overheated in the event of an uneven refrigerant distribution throughout the system, as typically occurs during the reversing process or shortly thereafter. When the system seeks to achieve an even distribution of refrigerant in the required direction of pumping, a temporary low pressure condition exists at the input to the compressor. The low pressure loading conditions are not readily distinguishable from loading conditions due to critical system problems as might be caused by blockage or loss of refrigerant. Control systems which sense pressure conditions, compressor loading and the like in a piston compressor system, and time out to shut down the compressor, may be necessary to avoid compressor damage, but too often shut down during reversing operation of the system.

Piston compressors also suffer from accumulation of oil from the compressor in the heat exchangers and conduits of the system, often resulting in insufficient quantities of oil returning to the compressor and eventual compressor failure.

According to the invention, a scroll compressor can be provided. The scroll compressor has an involute spiral impeller member which, when matched with a mating fixed scroll member, defines a series of crescent-shaped gas pockets between the two members. During compression, one of the members (the fixed scroll member) remains stationary, while the other member (the impeller member) is allowed to orbit, but not rotate, relative to the fixed scroll member. As this motion occurs, the pockets defined between the two members are pushed to the axial center of the spirals, between the two scroll members. The pockets simultaneously are reduced in volume. When a pocket reaches the center of the spirals, the gas in the pocket, now at high pressure, is discharged from a port located at the center. During compression, several pockets are compressed simultaneously, resulting in a very smooth process. Both the suction action (at the radially outermost point between the scroll members) and the discharge action (at the center) are continuous. Compressors of this type are available from the Copeland Corporation.

By-pass and direction reversing valves are used to provide alternative opposite flow directions of the refrigerant as a means to alter the heat pump system function from, for instance, heating to cooling, and vice versa. Thermal energy is carried from the ground source coils in the earth via a pipe network into the area to be heated in the winter, and vice versa in the summer. In the conditioned area, a fan is used to move air over a second coil system. The second coil system and fan combination is used to deliver the thermal energy into the area to be heated in the winter, and is used to remove thermal energy in the summer. The second coil system and fan combination is known as an air handler. Conventional ground source heat pump systems utilize air handlers of a size comparable to that used in an air-to-air heat pump of a similar power rating. Generally, ground source heat pump systems utilizing conventional air handlers provide coefficients of performance (COP) in the range of 2's to 5's.

The present invention uses oversized coils in the air handler, i.e., having an unconventionally large surface area as compared to compressor capacity. This is a unique feature of the invention. It has been found, via extensive testing, that larger than expected COPs result from the use of an oversized coil in the air handler. The measured COP of the invention is in the range of 4's to 7's, representing a significant improvement over known ground source systems. The trenched ground source heat exchanger of the invention provides more energy to the refrigerant, or extracts more energy, than other ground source techniques, enabling use of the larger air handler heat exchange coil on the indoor heat exchanger.

Copper coils, or those of other metal, when used with ground source heat pumps provide superior thermal conductivity between the carried refrigerant and the ground. Unfortunately, when buried in the ground, copper and other highly conductive metals are prone to corrode, via chemical reactions involving a loss of electrons, especially in acidic soils having a pH below 5.0. The corrosive process is known as oxidation and is similar to the reaction in a battery, resulting in a net electron flow from the copper metal to the acid in the soil. As the reaction continues over time, the copper becomes excessively oxidized whereby it becomes brittle and susceptible to holes or breakage.

The invention uses cathodic protection to protect the copper heat transfer coils and to prevent oxidation from providing a thermal barrier between the heat conductive copper and the surrounding soil. Cathodic protection involves coupling a quantity of a metal dissimilar to copper to the copper coils with a conductive wire. The dissimilar metal, which is buried in the ground near the copper coils, is generally zinc or magnesium. The dissimilar metal forms a sacrificial anode, and as connected to the copper tubing reacts preferentially with the acidic soil. The difference in electron valence between the dissimilar metals is such that the two metals comprise a type of dry cell battery. The copper acts as the cathode of the battery. Whereas charge needed for oxidation is more available at the sacrificial anode than at the copper, corrosion occurs at the anode rather than at the copper. The copper is continuously supplied with electrons by the sacrificial anode, and does not oxidize. The sacrificial anode oxidizes readily due to its net loss of electrons, hence the descriptive adjective "sacrificial". The anode is sacrificed to save the copper. No other ground source heating/cooling system has shown or taught the necessity of utilizing cathodic protection with such a unique heating/cooling system.

The invention includes a heat resistant soaker hose. The soaker hose can be substantially buried in the soil with the ground coils and preferably is disposed in the soil just above the ground coils. The soaker hose has an end coupleable to water sources, such as a water spigot, or a drain for condensation from the air handler coils. The soaker hose has a plurality of apertures disposed along its length. Water from the water source flows out of the apertures to moisten the soil surrounding the ground coils. The wet soil compacts around the ground coils to increase the efficiency of heat transfer. The soaker hose is preferably constructed of a heat resistant material and is unaffected by heat radiated from the ground coils.

The soaker hose affords immediate ground settlement and compaction, thus enhancing immediate high system efficiency and performance. Additionally, moisture removed from interior cooled air via the air handler can be usefully drained into the soaker hose, so as to keep the ground adjacent to the buried coils moist, enhancing heat dissipation.

System operation, such as compressor cycling, compressor shut-down and thermostat monitoring are supervised by a system controlling microprocessor. The microprocessor provides an efficient method for matching compressor operation to operating conditions. This is a unique control method heretofore unknown in a direct exchange ground source heating/cooling system.

As a further method of matching compressor operation to operating conditions, a variable frequency drive modulates the compressor speed. Thus, the compressor can be operated at a rate consistent with the amount of heating or cooling required by the load.

BRIEF DESCRIPTION OF THE DRAWINGS

There are shown in the drawings exemplary embodiments of the invention as presently preferred. It should be understood, however, that the invention is not limited to the precise arrangements shown, and is capable of variations in accordance with the scope of the invention as disclosed and claimed. In the drawings.

DETAILED DESCRIPTION OF THE PREFERRED EMBODIMENTS

Figure 5:
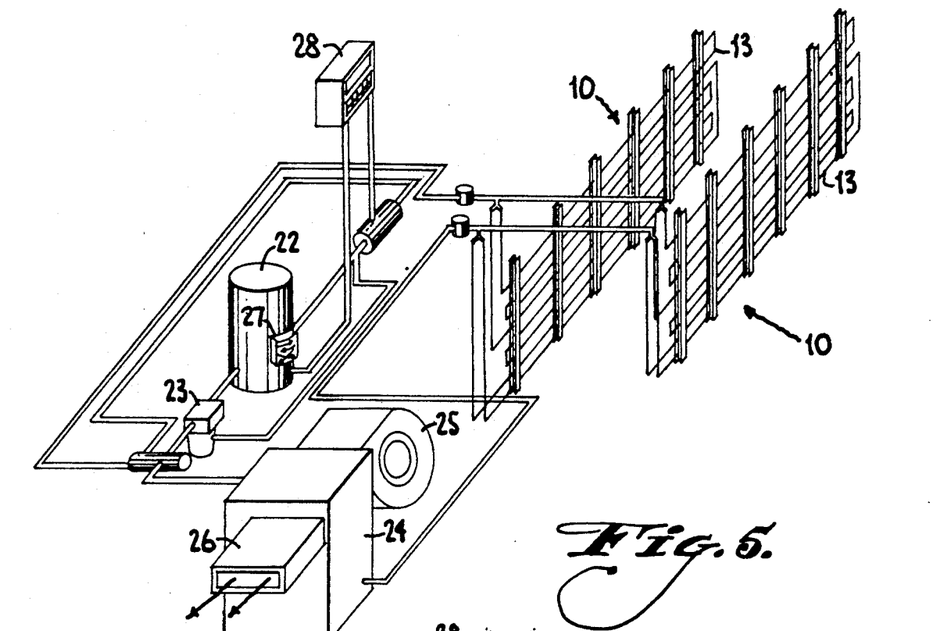
FIG. 5 is a schematic perspective diagram illustrating the elements of a full heat pump system according to the invention

The elements of an improved ground source heat pump system according to the invention are illustrated generally in FIG. 5, and more particularly in the remaining drawings. The system has an in-ground heat exchanger and a building heat exchanger coupled via conduits for refrigerant to at least one compressor and at least one expander, the compressor having at least one intake line and at least one discharge line. The in-ground heat exchanger is an improved configuration including at least one modular tube bundle. The bundle comprises a plurality of tubes disposed substantially horizontally in a stacked vertical array for vertical installation in trenches, the top of the bundle being installed below a predetermined line. A distributor having a series of orifice plates and fittings is arranged to distribute the refrigerant flow evenly to the tubes.

Figure 1:
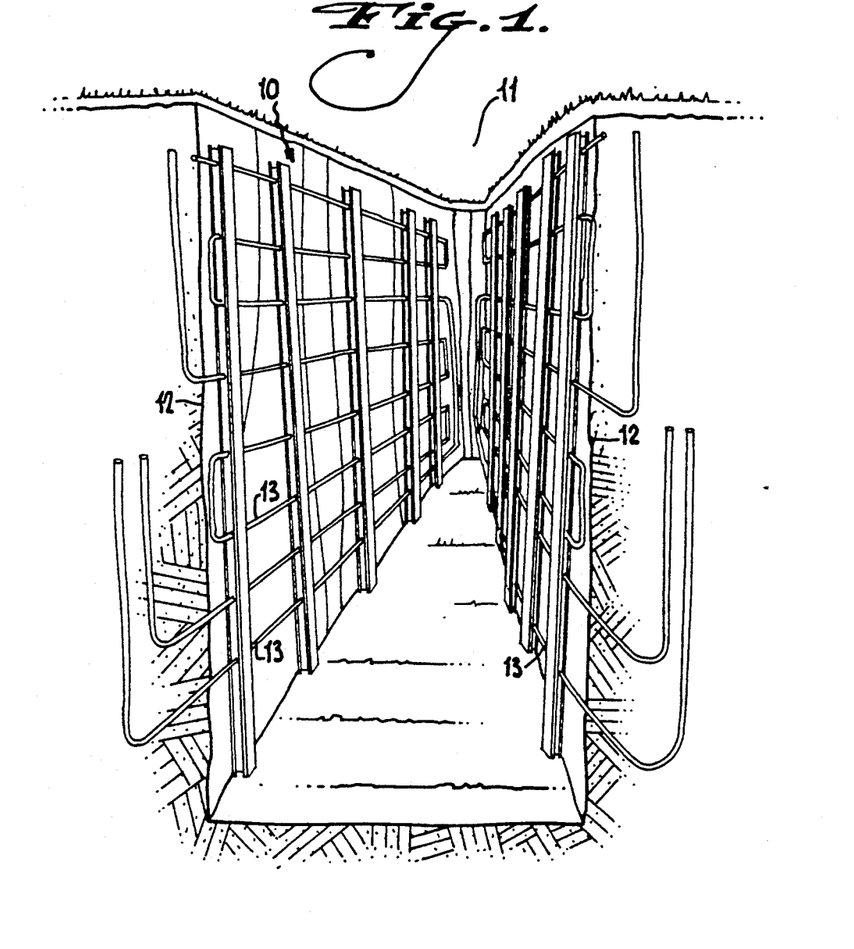
FIG. 1 is a perspective view, partly in section, of a trench heat exchanger according to the invention, awaiting backfilling.

FIG. 1 depicts modular tube bundle 10 disposed within a U-shaped trench 11 having trench walls 12. Trench 11 is preferably excavated by back-hoe bucket to a desired depth. Typically, the depth is sufficient whereby tube bundle 10 is disposed below the frost line. The excavation of trench 11 with a back-hoe bucket and the placement of bundle 10 within trench 11 is a simple process and a great improvement over prior art designs requiring significant excavation, land area usage and/or hole drilling effort. After disposing tube bundle 10 in excavation 11, excavation 11 is filled-in with soil and compacted. The individual tubes 13 of tube bundle 10 thereby communicate with the compacted soil for efficient thermal energy exchange therebetween.

Figure 2A:
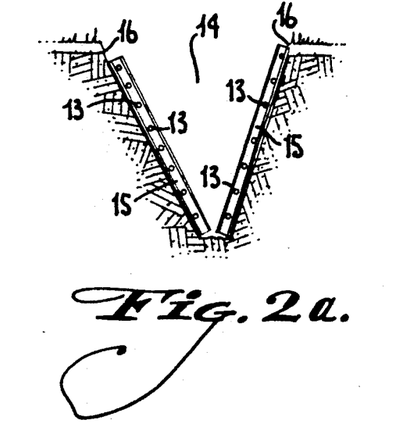
FIGS. 2a and 2b are section views of alternative trench configurations, the heat exchanger having a V-shaped design (FIG. 2a), and providing a working area above the trench (FIG. 2b).

An alternate arrangement is depicted in FIG. 2a. In FIG. 2a, V-shaped trench 14 is excavated using proper machinery. The trench 14 can also be formed by a back-hoe, however, the ground may be such that the sides collapse, or a V-shaped trench may be formed deliberately such that the tubes define a larger horizontally inclined section. A V-shaped configuration is formed using tube bundles 15 disposed on opposite sides at the base of V-shaped trench 14. Tubes 13 of V-shaped tube bundle 15 thereby lie adjacent to the trench walls 16. V-shaped trench 14 provides advantages since the outward sloping walls 16 are less prone to collapse during excavation or when installing V-shaped tube bundle 15. As with a U-shaped or rectangular cross section trench, after disposition of tube bundles 15 within V-shaped trench, 14, trench 14 is filled with soil and compacted to produce thermal communication between tubes 13 and the soil. The uppermost tube is normally installed at a sufficient distance from the surface to avoid problems with frost heaving. However, in warmer climates the uppermost tube can be nearer the surface, as shown in FIG. 2a. Of course, the uppermost tube should be spaced at least somewhat below the surface, to avoid temperature variations in the ground due to ambient conditions above the surface. In hot, desert areas, the uppermost tube is normally installed at a sufficient depth so as to avoid daily adverse effects from the sun.

Figure 2B:
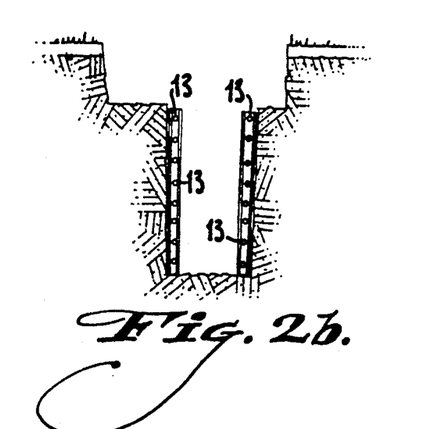

In FIG. 2b, the trench is formed with a rectangular lower cross section substantially as high as the tube bundles, and a wider rectangular cross section from that point to the surface of the ground. This arrangement provides a safe working area on the ledge thereby formed, allowing installers to manipulate the tube bundles without having to reach down from the surface or enter the deep and narrow part of the trench.

In the embodiments shown, a separate tube bundle is provided for each opposite side of the trench. It is also possible, particularly in a rectangular trench, to provide one long bundle for each trench, wrapping the bundle around the end of the trench such that only one set of connections are needed per trench.

Tubes 13 carry a fluid refrigerant for thermal exchange with the soil. Thermal transfer efficiency will be increased if the surface contact area between tubes 13 and the soil is maximized. For this reason, the tube construction depicted in FIGS. 3a and 3b is provided for use with tube bundles 10 or 15.

Figure 3A:
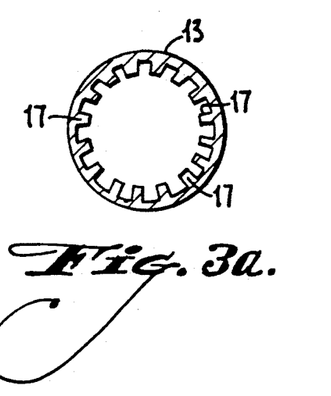
FIGS. 3a and 3b are section views through a conduit of the heat exchanger wherein the surface area is increased by rifling and/or splines or fins.

In FIG. 3a, tubes 13 have internal rifling 17 to increase the surface contact area between the coolant fluid and the tube 13 body. Since tube 13 is in tight communication with the soil, the rifling, in effect, increases the surface area of communication between the coolant fluid and the soil.

Figure 3B:
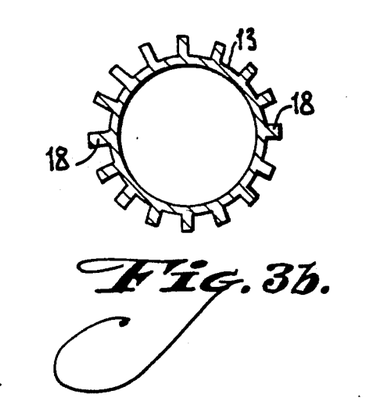

In FIG. 3b, tube 13 has external fins or splines 18 for increasing the surface area of tube 113 communicating with the soil. The greater surface area of tube 13 communicating with the soil, the higher the thermal energy transfer efficiency between the coolant fluid and the soil.

Figure 4:
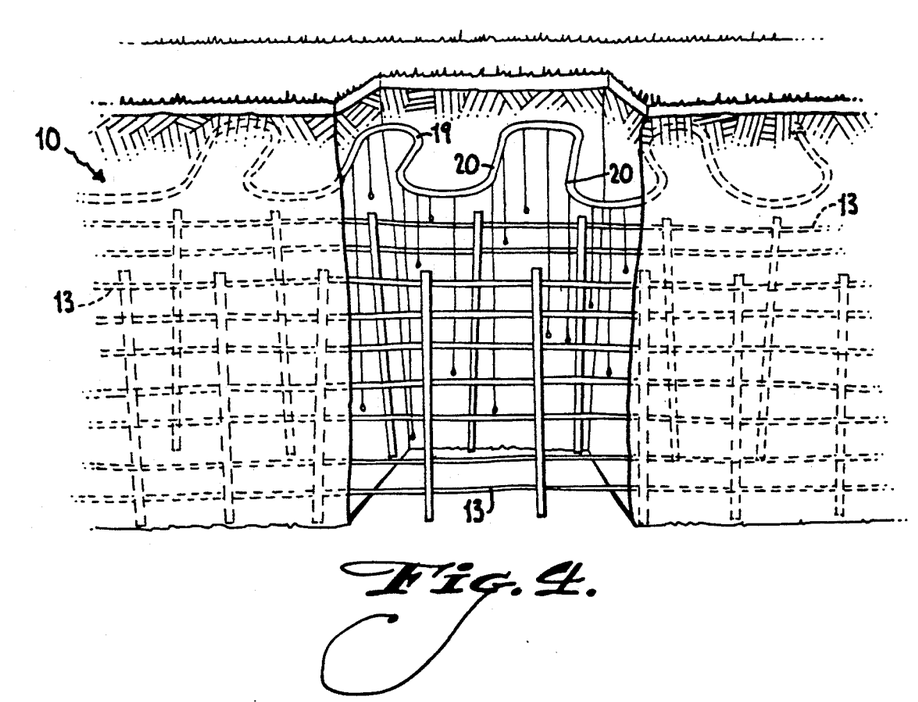
FIG. 4 is a schematic illustration, in perspective, of an alternative embodiment of the heat exchanger after backfilling, including a fluid delivery means for facilitating compaction and heat exchange.

The extent of soil compaction about tube bundle 10 or 15 also affects the efficiency of heat transfer. To improve compaction, the embodiment of FIG. 4 is provided. In FIG. 4, tube bundle 10 having individual tubes 13 is disposed in a trench, shown backfilled. A heat resistant soaker hose 19 is disposed in the soil just above tube bundle 10 (or 15), or otherwise in close proximity. The soaker hose is releasably coupleable to a water source and has a plurality of apertures 20 disposed along the length of its body. Water from the water source flows into soaker hose 19 and drips out of the plurality of apertures 20. The end 41 of soaker hose 19 opposite the water source is preferably sealed. Water dripping from apertures 20 in soaker hose 19 moistens the earth compacted about tube bundle 10 whereby the earth settles tightly around individual tubes 13 to increase the efficiency of heat transfer. Soaker hose 19 is preferably constructed of a heat resistant material so as to be unaffected by heat radiated from tube bundle 10 or 15. In the summer, the moisture/humidity removed from the air via the interior air handler is preferably drained into the soaker hose so as to help dissipate heat around coils in the ground and as to increase system efficiency.

FIG. 5 depicts a ground source heat exchange system 21 incorporating tube bundle 10. Compressor 22 is a common reciprocating type compressor for pumping the coolant fluid through system 21. Compressor 22 requires lubricating oil for lubricating its moving parts to ensure proper operation. Lubricating oil from compressor 22 will mix with the fluid coolant and be pumped through system 21. An excessive loss of lubricating oil, due to oil remaining in the ground coils, will disable compressor 22. Oil separator 23 is therefore provided to extract lubricating oil from refrigerant fluid where it is returned to an input of compressor 22. Without ever having an opportunity to flow into, or remain in, the ground coils, oil separator 23 is preferably disposed at an output of compressor 22 for removing oil from the refrigerant downstream of the compressor and upstream of the tube bundles. Oil separator 23 removes and accumulates the oil and outputs removed oil to the input of compressor 22, substantially eliminating oil from the flowing refrigerant yet ensuring lubrication of compressor 22 lubrication. The use of an oil separator in this manner is unique to the ground source heat pump system of the invention, and represents an improvement over the prior art, wherein complicated designs are employed in an attempt to return oil from the in-ground lines rather than simply keeping the oil out of the in-ground section of the lines in the first place.

Exchange coils (not shown) reside within air exchange unit 24. Air handler unit 24 is mounted within the confines of the structure to be heated or cooled by system 21. Air from air blower 25 is blown across the coils within air handler unit 24 and is heated or cooled by the thermal energy of the refrigerant fluid in the coils of air handler unit 24. The heated or cooled air is expelled into the structure from vent 26 of air handler unit 24. It has been found that by increasing the capacity of air handler unit 24 as compared to known ground source heat pumps or known air-to-air heat pump systems, specifically by increasing the size of the coils relative to the compressor capacity, the coefficient of performance (COP) of system 21 can be increased remarkably. It has been discovered that by proper matching of a larger number of coils than customary in an air handler 24 with a system 21 the COP is increased from a typical value in the 2's to 5's for prior art designs to typical values in the 4's to 7's, or higher. According to the invention the increased COP is obtained by increasing the size of the air handler coils 25% to 45% over standard industry sized coils compatible with a given compressor size.

As discussed, system 21 can be used for both heating and cooling. Change of the system from heating to cooling requires a reversal of flow of fluid refrigerant through the system. In order to accomplish such reversal, reversing valve 27 is provided.

During operation, system 21 is preferably controlled by a thermostat for proper heat regulation. The thermostat will act throughout the course of a period of operation to switch the compressor off and on, and in conjunction with other controls will reverse the flow of refrigerant through the system. Various problems occur when a compressor is manipulated as such, including short cycling, low refrigerant pressure, and high refrigerant pressure, which could possibly damage compressor 22. It is desirable therefore to provide system 21 with a microprocessor control unit 28 for controlling system operation.

Figure 6A:
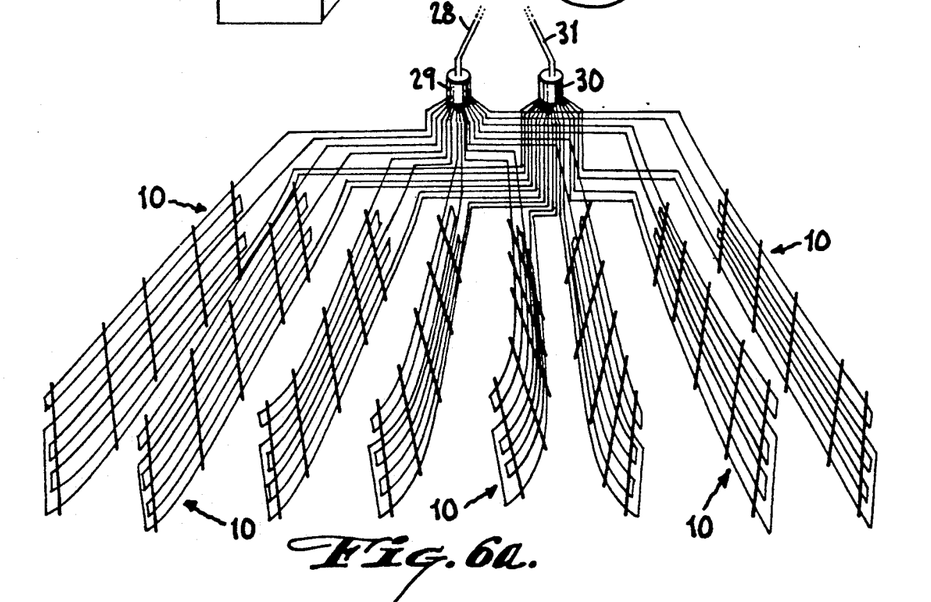
FIGS. 6a and 6b are perspective views illustrating a field of heat exchangers according to the invention, with alternative connections to distribution nodes.
Figure 6B:
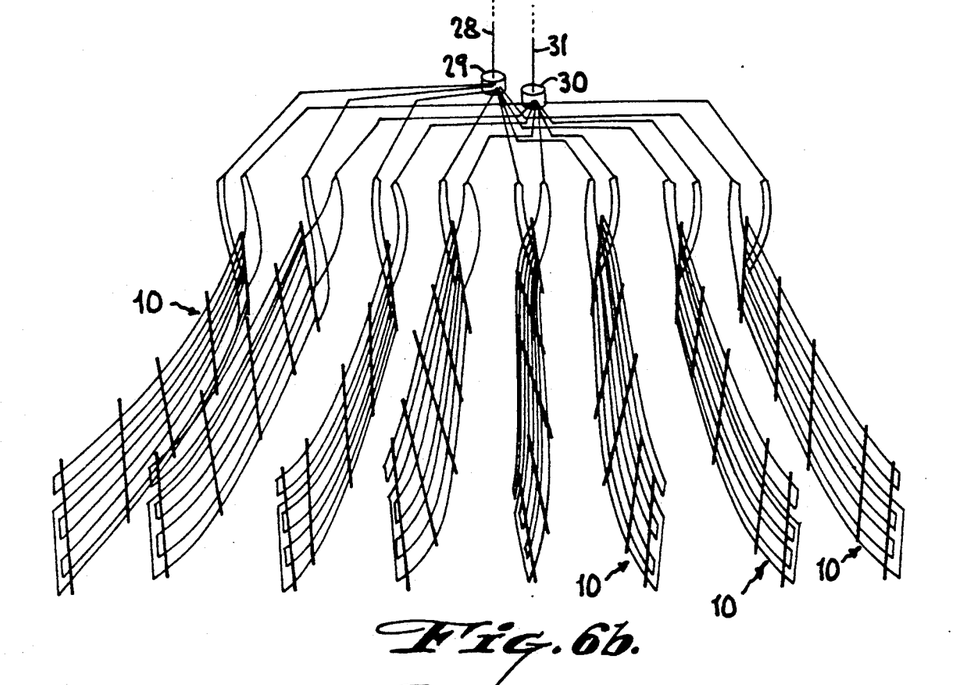

To increase efficiency of heat transfer, and to provide the necessary heating or cooling to larger loads, a plurality of tube bundles 10 (or 15) can be provided. FIGS. 6a and 6b show alternative connection arrangements for a field of tube bundles or the like. In FIG. 6a, tube bundles 10 are connected in parallel, the respective liquid connections being coupled to one manifold and the respective vapor connections being coupled to another manifold. In FIG. 6b, the individual tube bundles each coupled to a separate inlet and outlet manifold, and the respective manifolds are then coupled to manifolds leading to the conduits coupled to the compressor and expander. Input conduit 28, for example, delivers refrigerant fluid to manifold 29 for distribution to each of tube bundle 10. After flowing through tube bundle 10 and exchanging thermal energy with the soil, the refrigerant fluid flows to manifold 30 where it is transferred to return conduit 31. The designation of input conduit 28 and return conduit 31 is, of course, completely arbitrary due to the reversibility of system 21.

Figure 7:
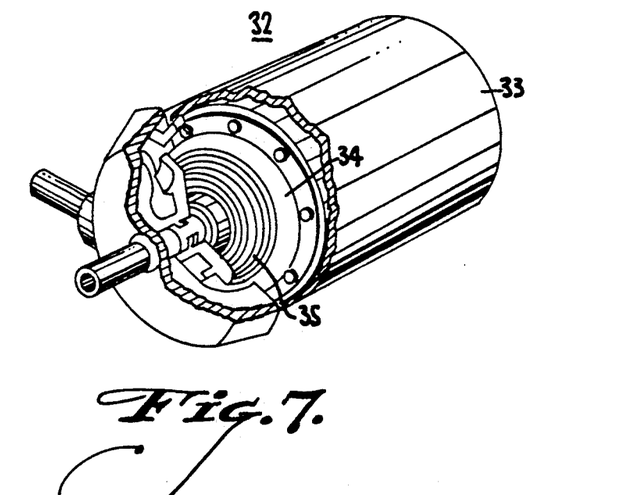
FIG. 7 is a cut away perspective view illustrating the scroll type compressor according to the invention.

As discussed above, prior art reciprocating compressors are problematic in that they are subject to failure when not properly lubricated and experience loading problems upon start-up. Furthermore, reciprocating compressors are designed primarily to pump refrigerant in the gaseous state and can be blocked or slugged when attempting to compress liquid. The scroll compressor of FIG. 7 is therefore provided.

Scroll compressor 32 has cylindrical housing 33, containing a motor coupled to orbit a movable involute spiral fin impeller member 34 relative to a mating fixed fin scroll 35. A coupling at the axial outside of housing 33 defines the inlet, admitting refrigerant between the impeller member and the fixed scroll. With orbiting of the movable impeller member 34 relative to the fixed fin 35, crescent shaped openings defined between the fins progress radially inwardly, and become smaller, thereby compressing the refrigerant and moving it to the axial center. An outlet communicating with the area of the center discharges the compressed refrigerant. A scroll compressor suitable for use with the invention is available from the Copeland Corporation.

Scroll compressor 32 is less susceptible to slugging than a piston compressor, and can efficiently pump liquid or gas as well as liquid/gas mixtures. Furthermore, scroll compressor 32 does not experience loading problems at turn-on and can start against high or low differential refrigerant pressure.

Figure 8:
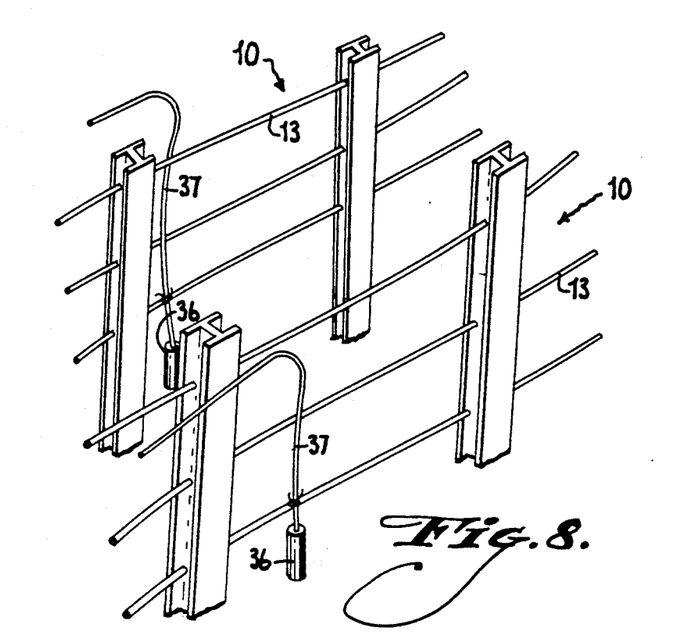
FIG. 8 is a perspective view showing a cathodic protection system for use in the system.
Figures 9, 10:
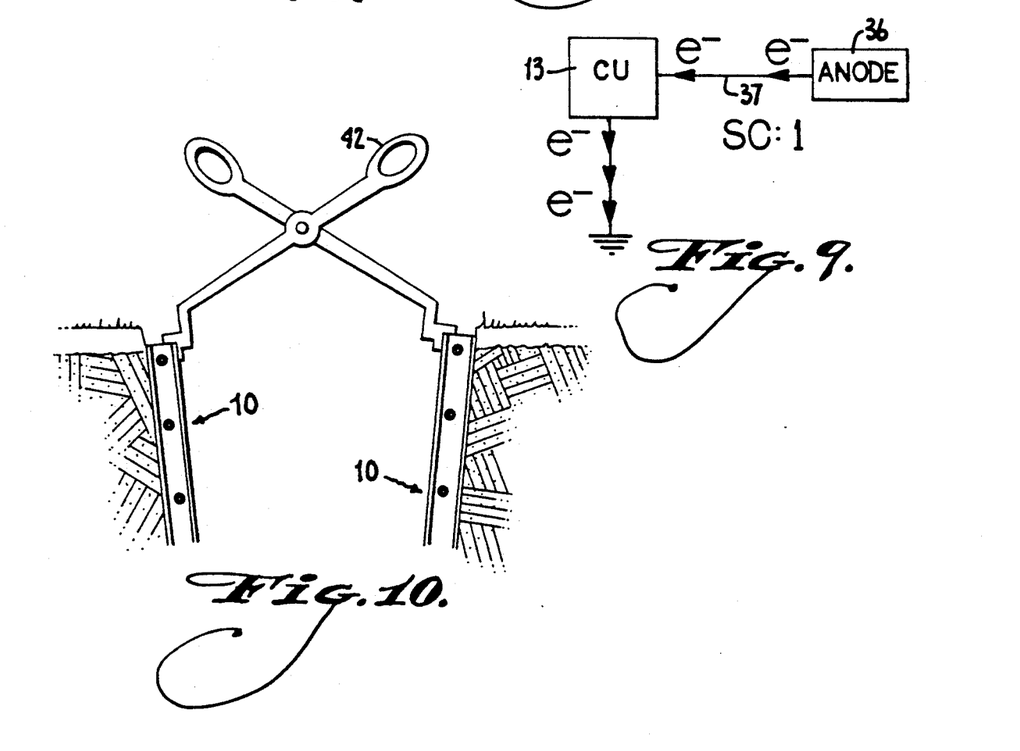
FIG. 9 is a schematic showing electron transfer associated with the cathodic protection system.
FIG. 10 is a schematic illustration showing installation of tube bundles in a trench, using a spreading tool.

Individual tubes 13 of tube bundles 10 or 15 are generally constructed of copper or aluminum or some similar highly conductive metal or plastic. It has been found that copper provides excellent heat transfer between refrigerant fluid and the soil. Copper, however, when placed in soil, especially soil having a low pH (acidic) and low resistivity, is subject to corrosion in the form of oxidation. The chemical reaction behind the oxidation of a metal, such as copper, involves a loss of electrons from the metal. To prevent a loss of electrons from the copper tubes 13 of tube bundles 10 and 15 the cathodic protection system of FIGS. 8 and 9 is provided. In FIG. 8, sacrificial anode 36 is electrically coupled directly to a tube 13 of tube bundle 10. The electrical coupling can be accomplished by use of wire 37 or other conductive component. Sacrificial anode 36 is a metal dissimilar to copper and optimum results occur when sacrificial anode 36 is magnesium or zinc.

The reaction occurring between copper tubes 13, anode 36 and acidic soil is shown in FIG. 9. Sacrificial anode 36 releases electrons which travel to copper tubing 13 through wire 37. Copper tubing 13 emits electrons to the soil which acts as an electron sink. The copper, although losing electrons to the soil, is continuously supplied with electrons from sacrificial anode 36. The copper tubing 13 therefore does not experience a net loss of electrons and hence does not oxidize. The sacrificial anode 36 does experience a net loss of electrons and will oxidize over time, but can easily be replaced. Sacrificial anode 36 is sacrificed to save copper tubing 13.

It can be appreciated from the above that the invention provides a much improved ground source heat pump system by eliminating draw backs of prior art systems including excessive land usage and complex difficult excavation required for installation of heat exchange tubing. Furthermore, the inclusion of a scroll compressor eliminates maintenance and reliability problems associated with ground source heat exchange systems using reciprocating type compressors. Microprocessor control of the system is provided for further improving efficiency and reliability. Cathodic protection is included to prevent corrosive oxidation of the in-ground coils. Soaker hoses are provided to enhance prompt soil compaction and improve heat dissipation.

Installation of the ground heat exchanger of the invention is relatively simple and safe. Inasmuch as the ground heat exchanger is mounted in a simple backhoe trench, the area used is modest. The tubes in the bundles are affixed to vertical support members, such that the tubes are readily placed along the sidewalls of the trench. As shown in FIG. 10, it is possible to employ a lever device 42 to bear outwardly on the vertical supports such that the tube rest immediately against the trench walls when backfilling. By mounting and installing the tubes in this manner, there is no need to make connections or install further fixing mechanisms in a manner that might require the worker to enter the trench.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. An improved ground source heat pump system, comprising:
an in-ground heat exchanger and a building heat exchanger coupled via conduits for refrigerant to at least one compressor and at least one expander, the compressor having at least one intake line and at least one discharge line, the compressor and the expander being coupled to the conduits such that the refrigerant is circulated in the conduits through pressure changes and corresponding temperature changes in the refrigerant, the in-ground heat exchanger comprising at least one modular tube bundle comprising a plurality of substantially horizontally oriented subterranean tubes, buried in a substantially planar vertical array for installation along substantially vertical walls of at least one that is backfilled for setting the array in thermal engagement with the earth, said at least one bundle having a top and bottom displaced vertically from one another, and the refrigerant being subjected to phase change in the conduits.

2. The ground source heat pump system according to claim 1 wherein the trenches are dimensioned for excavation with a backhoe.

3. The ground source heat pump system according to claim 1 wherein said top of said at least one tube bundle is installed below a frost line.

4. The ground source heat pump system according to claim 1 wherein said tubes have at least one of rifled inner-walls and finned outer walls to increase heat exchange efficiency.

5. The ground source heat pump system according to claim 1 further comprising a reversing valve operable to equalize refrigerant pressure when the system is shut-off.

6. The ground source heat pump system according to claim 1 further comprising a variable frequency drive operable to modulate compressor speed to match heating/cooling capacity to load conditions.

7. The ground source heat pump system according to claim 1 further comprising a heat-resistant soaker hose, said hose having intermittently spaced apertures and an above ground attachment end for decoupleable attachment to a water line, said hose placeable in substantial proximity to the at least one in-ground tube bundle for leaching water to the ground thereby improving earth compaction and heat dissipation in-ground about the tubes.

8. The ground source heat pump system according to claim 1 comprising a plurality of modular tube bundles and further comprising at least one distributor having a series of orifice plates and fittings arranged to evenly distribute the refrigerant flow to said tubes.

9. An improved ground source heat pump system, comprising:
an in-ground heat exchanger and a building heat exchanger coupled via conduits for refrigerant to at least one compressor and at least one expander, the compressor having at least one intake line and at least one discharge line, the compressor and the expander being coupled to the conduits such that the refrigerant is circulated in the conduits through pressure changes and corresponding temperature changes in the refrigerant, the in-ground heat exchanger comprising at least one modular tube bundle comprising a plurality of substantially horizontally oriented subterranean tubes, buried in a stacked vertical array for vertical installation in trenches, said at least one bundle having a top and bottom displaced vertically from one another, and the refrigerant being subjected to phase change in the conduits; and,
wherein said compressor comprises a scroll compressor having a spiral impeller orbiting relative to a fixed spiral scroll, whereby orbiting of said impeller pumps refrigerant through the system in a manner insensitive to phase of the refrigerant.

10. The ground source heat pump system according to claim 1 wherein the tubes are constructed of copper, further comprising a dissimilar metal electrically coupled to at least one of the copper tubes, said dissimilar metal acting as a sacrificial anode providing a flow of electrons to said tubes, thereby preventing oxidation of said copper tubes.

11. The ground source heat pump system according to claim 10 wherein said dissimilar metal is one of magnesium and zinc.

12. The ground source heat pump system according to claim 1 wherein said at least one bundle forms a V-shaped configuration having a top and a bottom, comprising a plurality of horizontally parallel tubes vertically spaced at increasing horizontal distances apart from bottom to top for disposition in a V-shaped trench.

13. The ground source heat pump system according to claim 1 wherein the building heat exchanger is coupled to a load including at least one of a building HVAC air handler and a hot water heat exchanger.

14. An improved ground source heat pump system of the type having an in-ground heat exchanger and a building heat exchanger coupled via conduits for refrigerant to at least one compressor and at least one expander, the at least one compressor having at least one intake line and at least one discharge line, the improvement comprising:

said in-ground heat exchanger having a plurality of tubes disposed in a substantially planar array which is inclined along a wall of a trench, said trench being backfilled for setting the planar array in thermal engagement with the earth.

15. The ground source heat pump system according to claim 14 wherein said tubes have at least one of rifled inner walls and finned outer walls to increase heat exchange efficiency.

16. The ground source heat pump system according to claim 14 further comprising a variable frequency drive to modulate compressor speed to match heating-/cooling capacity to load conditions.

17. The ground source heat pump system according to claim 14 further comprising a heat-resistant soaker hose, said hose having intermittently spaced apertures and an above ground attachment end for decoupleable attachment to a water line, said hose placeable in substantial proximity to the in-ground heat exchanger for leaching water to the ground thereby improving earth compaction about the exchanger.

18. The ground source heat pump system according to claim 14 wherein the in ground heat exchanger includes a plurality of metal tubes buried in soil, and further comprising a sacrificial anode coupled to the tubes, the sacrificial anode providing cathodic protection against corrosion of the tubes.

19. The ground source heat pump system according to claim 14, further comprising an oil separator coupled in series with the discharge line of the compressor, the oil separator extracting oil from the discharge line upstream of the conduits, the oil separator having an outlet coupled to the intake line of the compressor, whereby the compressor is lubricated while minimizing oil in the in-ground heat exchanger.

20. The improved ground source heat pump system according to claim 14, wherein the trench is substantially V-shaped, whereby the substantially planar array diverges outwardly along walls of the trench.

21. The improved ground source heat pump system according to claim 14 wherein the trench is dimensioned for formation via a backhoe.

22. The improved ground source heat pump system according to claim 14, wherein the compressor comprises a scroll compressor having a spiral impeller orbiting relative to a fixed spiral scroll, whereby orbiting of said impeller pumps refrigerant throughout the system.

23. The improved ground source heat pump system according to claim 14, further comprising a reversing valve for equalizing refrigerant pressure when the system is shut off.

24. The improved ground source heat pump system according to claim 14, further comprising a distributor couple to the tubes bundles, having a series of orifice plates and fittings arranged to evenly distribute refrigerant flow to said bundles.

25. The improved ground source heat pump system according to claim 1, further comprising an oil separator attached at a discharge line of a compressor to separate the oil from the gaseous refrigerant, the oil separator having an outlet coupled to an inlet of the compressor whereby oil in the conduits in minimized.

26. The improved ground source heat pump system according to claim 1, wherein the compressor comprises a scroll compressor having a spiral impeller orbiting relative to a fixed spiral scroll, whereby orbiting of said impeller pumps refrigerant through the system.

* * * * *